(12) United States Patent
Laspesa et al.

(10) Patent No.: US 8,657,056 B2
(45) Date of Patent: Feb. 25, 2014

(54) ACTIVATED-STROKE ACTUATOR, IN PARTICULAR FOR AN AUTOMOBILE SAFETY SYSTEM FOR THE PROTECTION OF PEDESTRIANS

(75) Inventors: Eric Laspesa, Sorgues (FR); Jean-Paul Nadeau, Saint Medard en Jalles (FR); Evrard Borg, Martignas en Jalle (FR)

(73) Assignee: Herakles, Le Haillan (FR)

( * ) Notice: Subject to any disclaimer, the term of this patent is extended or adjusted under 35 U.S.C. 154(b) by 407 days.

(21) Appl. No.: 12/676,703

(22) PCT Filed: Sep. 5, 2008

(86) PCT No.: PCT/FR2008/051583
§ 371 (c)(1),
(2), (4) Date: Sep. 13, 2011

(87) PCT Pub. No.: WO2009/044049
PCT Pub. Date: Apr. 9, 2009

(65) Prior Publication Data
US 2011/0314809 A1  Dec. 29, 2011

(30) Foreign Application Priority Data
Sep. 7, 2007  (FR) ..................... 07 57405

(51) Int. Cl.
*B60R 21/34* (2011.01)
(52) U.S. Cl.
USPC ............... 180/274; 180/69.2; 296/187.04
(58) Field of Classification Search
USPC ............... 60/632–638; 180/69.2, 274, 289; 296/187.04, 187.05, 187.06, 187.09, 296/193.11
See application file for complete search history.

(56) References Cited

U.S. PATENT DOCUMENTS

| 5,294,150 | A | * | 3/1994 | Steffens, Jr. | 280/801.2 |
| 5,358,275 | A | * | 10/1994 | Fohl | 280/806 |
| 6,302,458 | B1 | * | 10/2001 | Wang et al. | 293/132 |
| 6,877,776 | B2 | * | 4/2005 | Ukita et al. | 280/806 |
| 6,910,558 | B2 | * | 6/2005 | Wang et al. | 188/300 |
| 6,942,056 | B2 | * | 9/2005 | Nadeau et al. | 180/274 |
| 7,299,630 | B2 | * | 11/2007 | Browne et al. | 60/527 |
| 7,374,008 | B1 | * | 5/2008 | Neal et al. | 180/274 |
| 7,520,363 | B2 | * | 4/2009 | Yamaguchi et al. | 180/274 |
| 7,650,957 | B2 | * | 1/2010 | Takakura et al. | 180/274 |
| 2004/0134705 | A1 | | 7/2004 | Nadeau et al. | |
| 2005/0264036 | A1 | | 12/2005 | Kramarczyk et al. | |
| 2006/0279077 | A1 | * | 12/2006 | Nakano et al. | 280/806 |
| 2011/0011256 | A1 | * | 1/2011 | Borg et al. | 91/356 |

FOREIGN PATENT DOCUMENTS

| DE | 71 21 970 U | | 11/1973 |
| DE | 20 2004 009 772 U1 | | 9/2004 |
| DE | 10 2005 035 006 A1 | | 2/2007 |
| DE | 102006028754 A1 | * | 12/2007 |
| FR | 2 848 947 A1 | | 6/2004 |
| JP | 61-7369 U | | 1/1986 |
| JP | 3-41207 U | | 4/1991 |
| JP | 3804719 B | | 8/2006 |

* cited by examiner

*Primary Examiner* — James English
(74) *Attorney, Agent, or Firm* — Hamre, Schumann, Mueller & Larson, P.C.

(57) ABSTRACT

Pyrotechnic actuator in particular for lifting the hood of an automobile in the event of a collision with a pedestrian.
The actuator comprises a return-braking arrangement (25) acting between the rod (17) and the body (13) of the actuator and having an inertial actuating threshold in order to brake the rod in return only if it is subjected to a force under a sufficient acceleration truly representative of a collision.

13 Claims, 4 Drawing Sheets

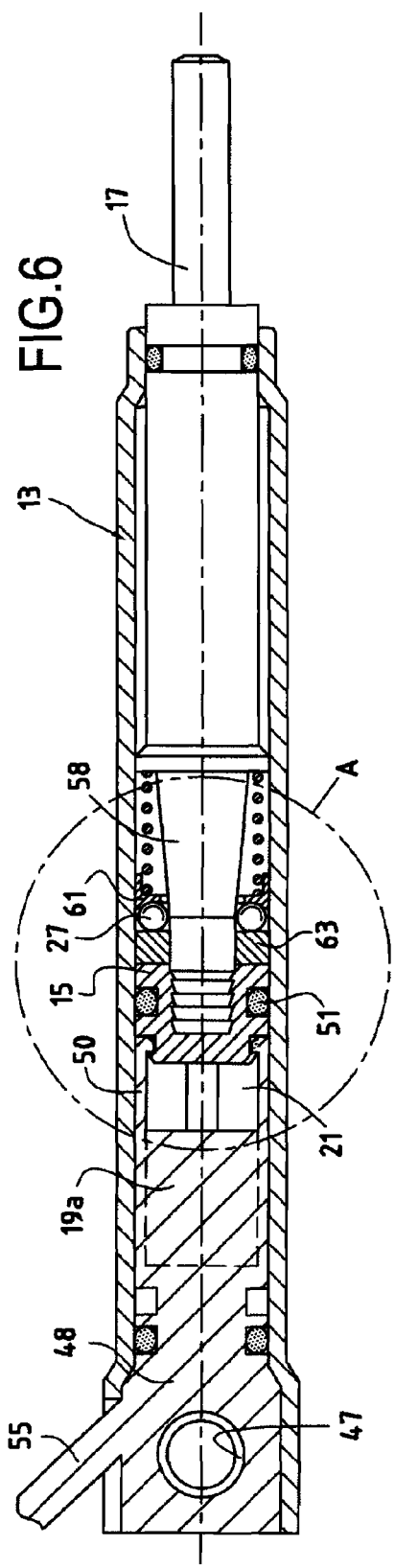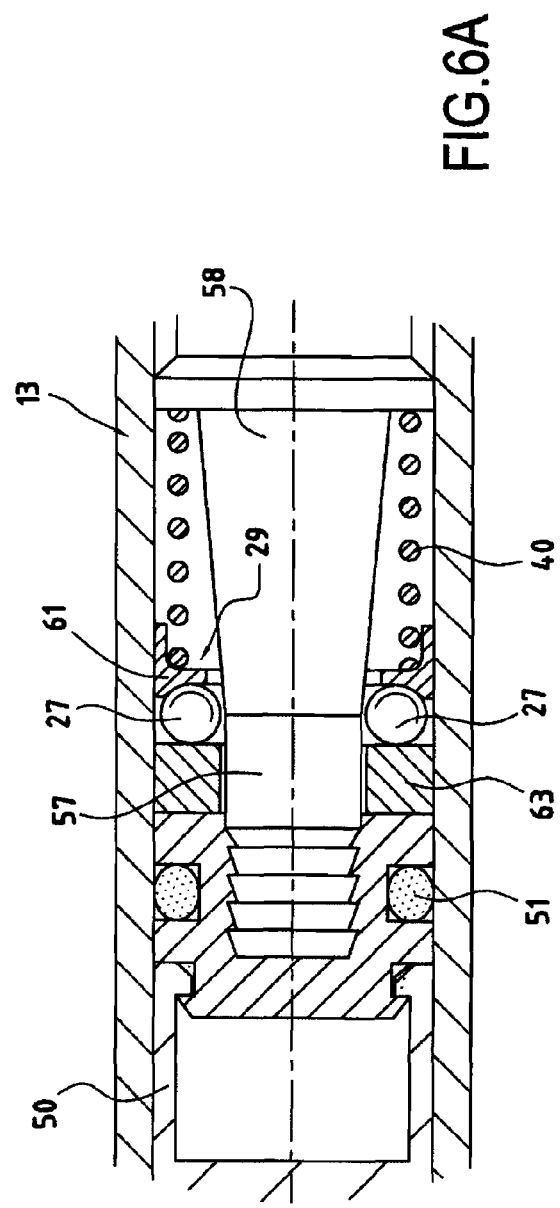

ACTIVATED-STROKE ACTUATOR, IN PARTICULAR FOR AN AUTOMOBILE SAFETY SYSTEM FOR THE PROTECTION OF PEDESTRIANS

The invention relates to an activated-stroke actuator more particularly intended to be integrated into a safety system with the aim of protecting a pedestrian in the event of a frontal impact with a motor vehicle. The invention more particularly concerns an improvement of such an actuator making it possible to return this safety system to its original position, after activation, when the circumstances allow it and in particular following a false detection or in the event of avoiding the obstacle.

Patent FR 2 878 212 describes a safety system for the protection of a pedestrian when he is struck by a motor vehicle. This system comprises a mechanism making it possible to lift the hood of the motor vehicle rapidly in the event of a collision. Specifically, in the event of a collision, the head of the pedestrian frequently strikes the hood of the vehicle. This impact of the head on the hood causes deformations of the hood. Beyond a certain degree of deformation, the hood comes into contact with the engine block and all the rigid components which surround this engine. It is at this moment that the head of the pedestrian is subjected to the greatest deceleration, which can cause serious injuries to the victim. For this reason, the system mentioned above is designed to lift the hood suddenly by a certain height so as to prevent the pedestrian and in particular his head from striking the engine block after a deformation of the hood. The hood is lifted at its rear, that is to say on the windshield side, the hood remaining fastened at the front of the motor vehicle.

Thus, such a safety device, if it is actuated in time by suitable detection means, makes it possible to lift the lid by 80 mm at least in 30 milliseconds, that is to say in a very short time interval after the detection of an imminent impact.

It is also known, after lifting of the hood, to allow a damped return of the hood, making it possible to accompany the impact on the hood so as to diminish the effect thereof. This return-damping system is advantageously combined with the actuator having lifted the hood. In this way, the assembly consisting of the hood, the lifting mechanism and the piston of the actuator is retracted under the impact (after lifting of the hood) while being braked and then blocked. The damping device is arranged in the body between the piston and the rod for a minimum space requirement and a negligible extra cost.

However, it occurs that the safety system described above is actuated and therefore that the hood is lifted without the accident having taken place, for example in the event of an erroneous detection or if the pedestrian does not strike the hood. In such a circumstance, it is desirable that after the incident the driver can reposition the hood, (which has not been deformed) into its initial position, doing so in a simple and intuitive manner.

The invention allows this repositioning of the hood.

More precisely, the invention relates to an activated-stroke actuator of the type comprising a body housing a piston connected to a rod projecting at the end of said body and means for propelling said piston in response to an activation command, characterized in that it comprises a return-braking arrangement, with an inertial actuating threshold, acting between the brake and the body in order to brake said rod only when it is subjected to a return force below an acceleration with a value above a threshold value, in that said means for propelling said piston in response to an activation command comprise a gas generator with pyrotechnic actuation mounted in said body opposite said piston, in that said return-braking arrangement comprises at least one ball housed in an annular cavity formed between said rod and the inner wall of said body, in that said cavity comprises two adjacent portions in the continuation of one another, a first portion close to the piston and having a radial height greater than the diameter of said ball, and a second portion having a radial height which decreases from the end of said first portion, said ball engaging in said second portion when said return force is applied to said rod under an acceleration with a value above the aforementioned threshold value, and in that said braking arrangement additionally comprises means for retaining said ball in said first portion, at rest.

Such an actuator can advantageously be fitted in a mechanical absorption system associated with a hood which can be lifted in the event of impact with a pedestrian. The return-braking arrangement integrated into the actuator is noteworthy for its design simplicity associated with increased reliability. The thus improved return-braking arrangement does not entail the addition of parts requiring complex and costly machining.

By virtue of the means of the braking arrangement which are intended to retain the ball in the first portion, at rest, said ball engages in the second portion only when the return force is applied to the rod with an acceleration whose value is greater than the aforementioned threshold value.

If need be, the assembly sliding inside the actuator, and therefore the whole mechanism for lifting the hood, can be placed back in its initial position by slowly moving the rod of the actuator, in order not to exceed the aforementioned threshold value. In these conditions, the return-braking arrangement is not stressed and the hood can be put back in place without effort.

According to an exemplary embodiment of the invention, the means for retaining the ball in the first portion of the cavity comprise a spring. This spring can, for example, be installed in the second portion of the cavity and mounted in compression between the ball and one end of the cavity.

According to another exemplary embodiment, the means for retaining the ball in the first portion comprise a sleeve fitted into the cavity along the second portion and sliding against the inner surface of the body of the actuator. The sleeve is provided with a collar situated outside the cavity and in contact with the rod outside the cavity via a retaining element developing a limited cohesion force between said collar and said rod. Furthermore, the braking arrangement can comprise a spring with a force below the cohesion force connecting the collar and the rod, elastically urging the ball toward the second portion of the cavity.

Advantageously, the device in fact comprises a plurality of balls arranged side by side annularly in said cavity. In order to adjust the aforementioned threshold value, an annular weight can be added between the piston and the ball or balls. Since the piston is actuated by a gas generator with pyrotechnic activation, a gas expansion chamber is generally defined between the piston and this generator. Advantageously, a calibrated leakage orifice is provided in the wall of this expansion chamber. Calibrating this leakage is within the competence of a person skilled in the art. The leakage is chosen so that the pressure exerted to move the rod of the actuator is maintained for the time of the impact (typically a few milliseconds to a few tenths of a second) and then returns progressively to atmospheric pressure (after a few seconds). In this way, the expansion chamber is returned to atmospheric pressure when the driver presses on the hood to return the whole of the mechanism associated with the piston into its initial position.

The invention will be better understood and other advantages thereof will become better apparent in light of the description which follows of a number of embodiments of an actuator according to its principle, the description being given purely by way of example and with reference to the appended drawings, in which:

FIG. 6 is a view similar to FIG. 1 illustrating a variant;

FIG. 6A is a view on an enlarged scale of the enclosed area A in FIG. 6;

Figure 1:
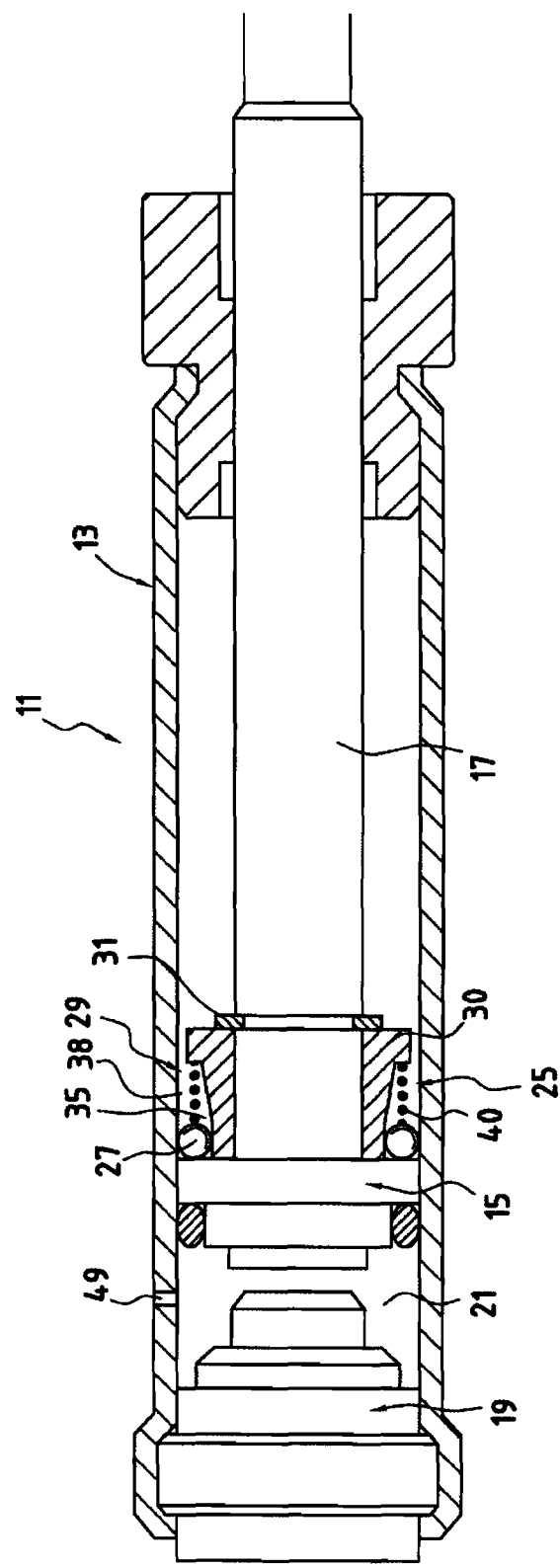
FIG. 1 is a schematic general view, in longitudinal section, of an actuator according to the invention.

The activated-stroke actuator 11 as represented in FIG. 1 comprises a generally cylindrical body 13 housing a piston 15 connected to a rod 17 projecting axially at one end of the body. This body also houses means for propelling the piston in response to an activation command. In the example represented, these means consist of a gas generator 19 with pyrotechnic activation mounted in the body opposite the piston. The gas generator is crimped at the end of the body which is opposed to that where the rod 17 projects axially. A gas expansion chamber 21 is thus formed between the generator and the opposite end of the piston.

As mentioned above, the rod 17 can be connected to a mechanism making it possible to lift the hood of an automobile in the event of a frontal impact with a pedestrian.

Furthermore, the body 13 houses a return-braking arrangement 25, with an inertial actuating threshold, making it possible to brake or even block the rod 17 in return, after its maximum deployment outside the body, in order to allow the hood to accompany the impact by a return movement, while deforming. This braking arrangement is effective only if the force which is exerted on the rod, in return, has a sufficient acceleration with a value above a predetermined threshold value. This threshold value is chosen to be sufficiently low so that this is always the case when the pedestrian actually strikes the hood.

In the example, the return-braking arrangement comprises at least one ball 27 housed in an annular cavity 29 formed between the rod 17 and the inner wall of the body. According to the example described in FIG. 1, an annular part 30 is fastened to the rod and is in contact with the piston 15 secured to this same rod. The annular part is immobilized in this position by a collar 31 fitted in a groove in the rod. Thus, for this example, the annular cavity 29 is defined between the piston 15, the annular part 30 and the inner wall of the body 13. It comprises, by virtue of the shape of the annular part, two adjacent portions in the continuation of one another, a first portion 35 close to the piston and with a radial height greater than the diameter of the ball, and a second portion 38 with a radial height which decreases from the end of said first portion.

Figure 2:
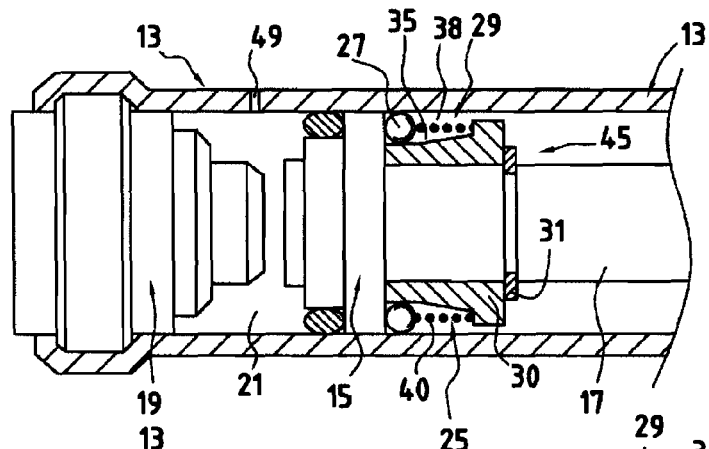
FIGS. 2 to 5 are schematic detail views illustrating the operation of the return-braking arrangement.
Figure 3:
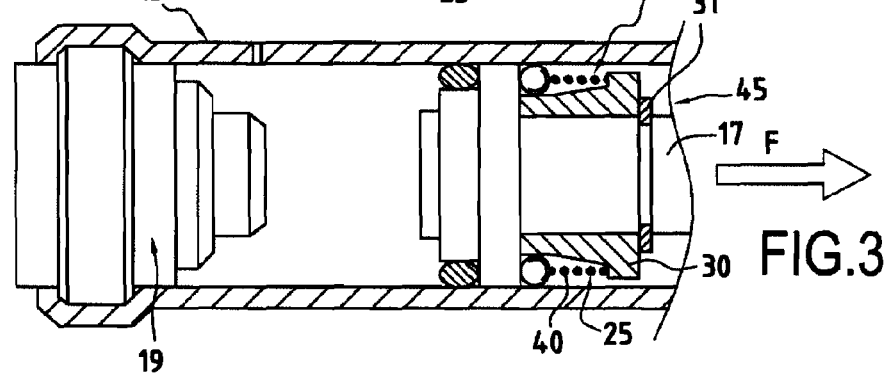
Figure 4:
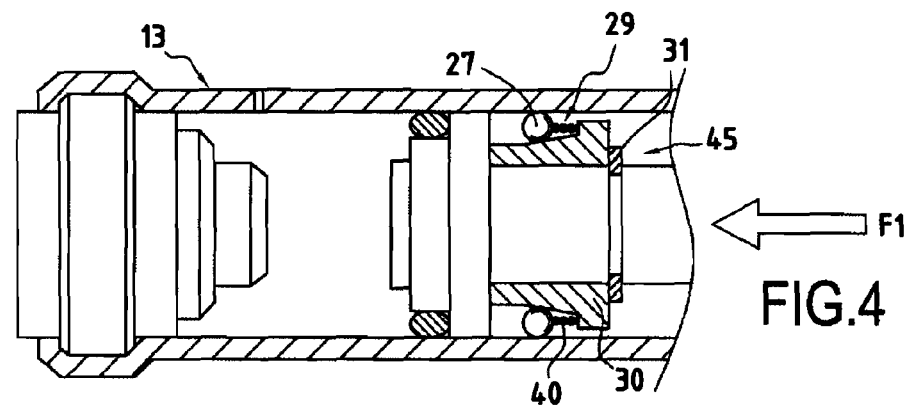

In fact, advantageously, the cavity contains a plurality of balls 27 arranged side by side annularly. Furthermore, the braking arrangement comprises means for retaining the ball or balls in the first portion, at rest. In this case, a spring 40 is housed in the cavity to urge the ball or balls in the direction of the piston, that is to say in order that they remain normally in said first portion 35 of the cavity. The spring is installed in the second portion and is mounted in compression between the balls and the opposite end of the cavity. This arrangement defines an acceleration threshold which must be exceeded in order for the rod 17 to be braked in return when it is subjected to a force tending to reintroduce it into the body 13 after its deployment by triggering the gas generator 19 with pyrotechnic actuation. This is illustrated by FIGS. 2 to 4.

Thus, a sliding assembly 45 is defined in the body; it is composed of the piston 15, the rod 17 and, according to the example, the annular part 30 borne by the rod. The sliding assembly is capable of driving the balls 27 and the spring 40, which are housed in the cavity. Initially, the balls are retained against the piston under the action of the spring. In this situation, the balls are confined in a sufficient space (first portion 35 of the cavity) to avoid any retaining force during the movement of the sliding assembly. That is the situation illustrated in FIG. 2. When the pyrotechnic gas generator is activated (FIG. 3), the sliding assembly 45 moves under the gas pressure and the rod is repelled outside the body axially until the annular part, forming a stop, meets the end of the body.

Throughout this movement, which is manifested by the lifting of the hood in the envisioned preferential application, the balls remain in contact with the piston and, therefore, remain in said first portion 35 of the cavity 29.

In the event of an impact transmitted to the rod by an axial force F1 tending to retract it again into the body (FIG. 4), the spring 40 absorbs some of the mechanical energy while compressing and, with the aforementioned acceleration threshold being exceeded, the balls 27 engage into the second portion 38 of the annular cavity 30. They follow the substantially frustoconical profile of the annular part and, by following this profile, the balls rub against the inner surface of the wall of the cylindrical body until causing the deformation of the tube forming the body 13. They finish by blocking the reverse movement of the sliding assembly. This type of progressive braking before blocking of the rod, under the effect of the impact, makes it possible to accompany the deformation of the hood and contributes to damping the impact.

The situation in FIG. 4 is possible only if the return force is applied under a sufficient acceleration, something which is virtually always the case during an accident.

Figure 5:
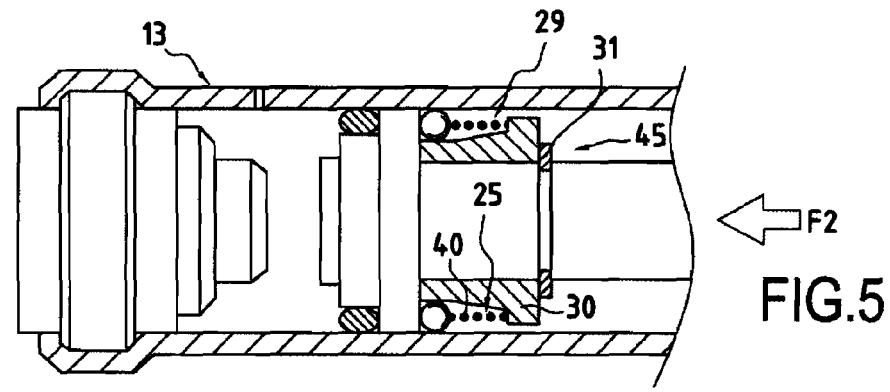

By contrast, if the device for lifting the hood has been actuated following a poor detection or if the pedestrian has been avoided, the hood has been lifted but is not deformed. It can therefore be closed again by the owner of the vehicle. According to an important feature of the invention, the sliding assembly 45 can be replaced in its initial position by exerting a small force F2 on the rod 17, that is to say by slowly closing the hood, in order to make it slide toward the inside of the body without the balls entering said second portion of the cavity. That is the situation illustrated in FIG. 5.

Advantageously, after the sudden deployment of the rod, the pressurized gas accumulated in the expansion chamber 21 escapes progressively through a leakage orifice 49, which is calibrated, until the pressure returns progressively to atmospheric pressure, this occurring after a few seconds. The expansion chamber is therefore depressurized when the hood is closed (in the absence of impact), the actuator not developing any resistance. The hood can be closed without effort by the driver, or even close automatically under the effect of its own weight.

In the variant shown in FIGS. 6 and 6A, where the analogous elements bear the same reference numbers, the activated-stroke actuator comprises a cylindrical body 13 containing a piston 15 secured to a rod 17 which projects outside the body, at an axial end thereof. At the other end, a pyrotechnic gas generator 19a is integrated into a base 48 of molded plastic which comprises a connection element in the form of a bushing 50, which is breakable or disconnectable, connecting the piston to the pyrotechnic generator. Thus, before activation, an expansion chamber 21 of predetermined initial volume is defined in the cylindrical body. The piston comprises a sliding seal 51 housed in an annular groove. The base of plastic 48 comprises a transverse drilling 47 for the passage of a mounting journal. The base of plastic is provided with a two-wire electric cord 55 for triggering.

The rod 17 is fastened to the piston and comprises, in the vicinity thereof, a cylindrical portion 57 and a frustoconical portion 58 which widens in the rod outlet direction as far as a collar in sliding contact with the cylindrical inner surface of the body 13. The two, cylindrical and frustocontical, sections define with the body an annular cavity 29 comparable to that which is represented in FIG. 1. This annular cavity houses the spring 40 and the balls 27 as in the preceding embodiment. A sliding collar 61 is interposed between the end of the spring and the balls. Furthermore an annular weight 63 is arranged between the piston and the balls. This weight has the effect of amplifying, through inertia, the compression of the spring 40, which has the consequence of engaging the balls in the second section of the cavity under the effect of the acceleration of the piston resulting from the impact of the pedestrian on the hood.

The operation of this embodiment is similar to the preceding one and will not be described in more detail.

Figure 7:
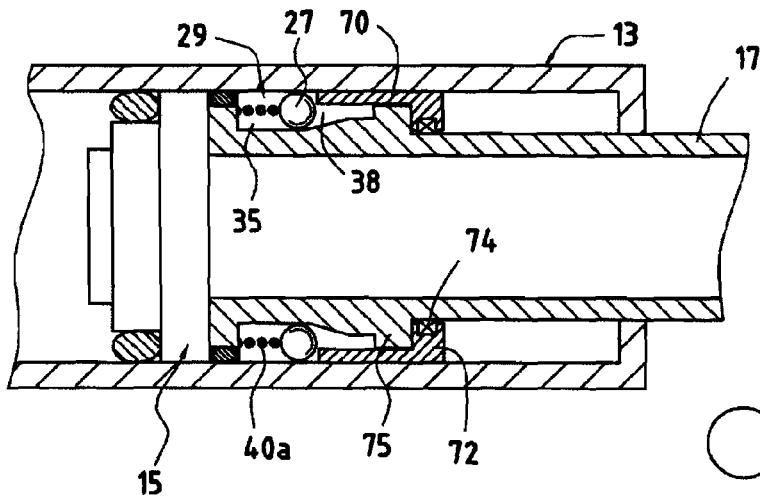
FIG. 7 is a schematic view illustrating another variant.

FIG. 7 illustrates another embodiment of the return-braking arrangement. In this embodiment, the return-braking arrangement comprises means for retaining the ball in the first portion of the cavity 29, at rest. These means comprise a sleeve 70 fitted into the cavity 29 along said second portion 38 thereof and sliding against the inner surface of the body. The sleeve is provided with a collar 72 situated outside the cavity beyond said second portion, and this collar is in contact with the rod 17 outside the cavity. A retaining element 74 developing a limited cohesion force between the collar 72 and the rod is situated at the interface between these two elements. It is fastened to the collar.

Moreover, the ball or balls 27 are urged elastically toward the second portion of the cavity by a spring 40a which develops a force below said cohesion force between the collar 72 and the rod 17. The spring is mounted between the piston 15 and the balls 27. Of course, an annular collar could be interposed between the spring and the set of balls. In the example described, the retaining element 74 is an annular friction seal. The sleeve penetrates the cavity so that its end is in contact with the balls when the latter are situated in said first portion 35 of the cavity. Before activation of the actuator, the collar of the sleeve is in contact with an annular stop 75 defining the end of the second portion of the cavity, and the sleeve completely penetrates the cavity in contact with the balls. The spring is compressed. However, the force of the spring is not sufficient to overcome the resistance of the retaining element arranged between the collar and the rod. The operation is as follows.

When the actuator is activated, the piston 15 moves with a sufficient force to overcome the resistance of the retaining element 74 and the sliding assembly moves taking the sleeve 70 with it, the ball or balls being retained in place by said sleeve.

During the impact, the rapid setting in motion of the sliding assembly, in return, is not followed by the sleeve 70 of which the retaining element 74 slides along the rod. In other words, the sleeve is detached from the stop 75 defined in the rod and no longer bears on the balls. The spring 40a relaxes and pushes the balls 27 into the second portion of the cavity, causing the damping and blocking effect.

By contrast, if the impact has not taken place, it is possible to return the actuator into in its initial position by imparting a force to the rod 17 with a sufficiently small acceleration so that the retaining element 74 does not slide on the rod. Therefore, the sleeve remains coupled to the stop defined on the rod during the return movement of the sliding assembly, and the balls are maintained in the first portion.

Figure 8:
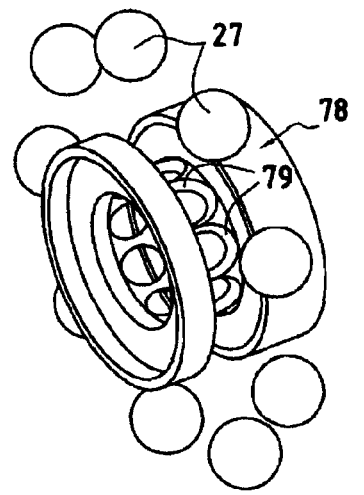
FIG. 8 is a detail view illustrating the mounting of the balls.
Figure 9:
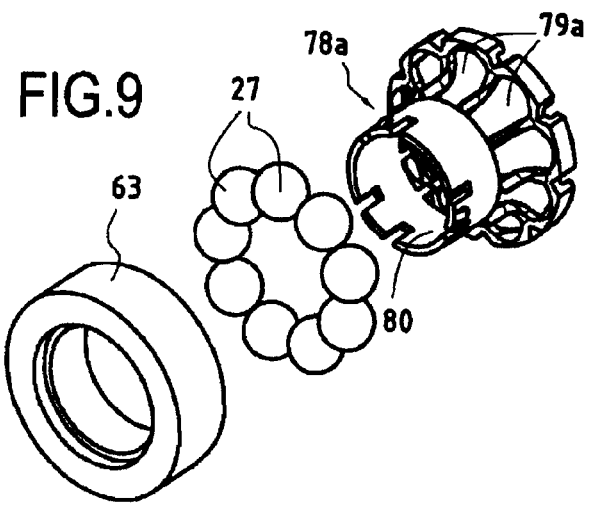
FIGS. 9 and 10 are mounting variants of FIG. 8.
Figure 10:
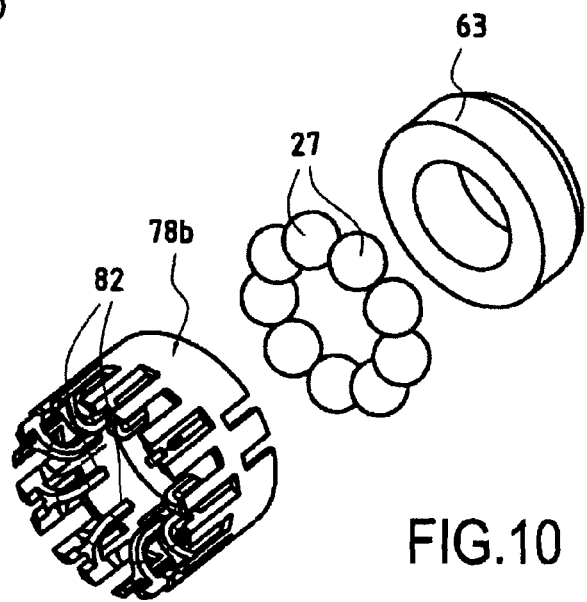

As shown in FIGS. 8 to 10, the balls can advantageously be housed in a barrel-forming annular support 78 mounted movably in the cavity. The support comprises cells 79 receiving the balls. According to the example shown in FIG. 9, the support 78a comprises a cylindrical portion 80 prolonged by a plurality of cells 79a, each cell receiving one ball. The weight 63 is housed on the cylindrical portion 80 while retaining the balls in their cells. A subassembly which is easy to mount in the cavity is thus available. At the moment of the activation, the barrel 78 or 78a breaks and the balls engage in said second portion of the cavity.

The embodiment shown in FIG. 10 is similar. It comprises a cylindrical sleeve 78b provided internally with flexible ribs 82 allowing the insertion of the balls 27. The weight 63 is housed in a cylindrical portion of this sleeve. It makes it possible to retain the balls in position.

It should be noted that the barrel can be maintained centered by the spring. In this way, it is not in contact, before operation, with the frustoconical part of the second portion of the cavity. It is thus possible to avoid the "sticking" effects which appear between two parts in contact at rest during a long period of time. These sticking effects oppose the movements, for which reason it is advantageous to avoid them.

The invention claimed is:

1. An activated-stroke actuator of the type comprising a body housing a piston connected to a rod projecting at the end of said body and a gas generator for propelling said piston in response to an activation command, comprising a return-braking arrangement, with an inertial actuating threshold, acting between the rod and the body in order to brake said rod only when it is subjected to a return force with an acceleration having a value above a threshold value, wherein said gas generator comprises pyrotechnic actuation mounted in said body opposite said piston, wherein said return-braking arrangement comprises at least one ball housed in an annular cavity formed between said rod and an inner wall of said body, wherein said cavity comprises two adjacent portions in the continuation of one another, a first portion close to the piston and having a radial height greater than the diameter of said at least one ball, and a second portion having a radial height which decreases from the end of said first portion, said at least one ball engaging in said second portion when said return force is applied to said rod under an acceleration with a value above the aforementioned threshold value, wherein said braking arrangement additionally comprises a spring for retaining said at least one ball in said first portion, at rest; and wherein said spring is installed in said second portion and is mounted in compression between said at least one ball and one end of said cavity.

2. The actuator as claimed in claim 1, wherein said at least one ball comprises a plurality of balls arranged side by side, annularly in said cavity.

3. The actuator as claimed in claim 2, wherein said plurality of balls are housed in a barrel-forming annular support mounted movably in said cavity.

4. The actuator as claimed in claim 1, additionally comprising an annular weight interposed between said piston and the at least one ball.

5. The actuator as claimed in claim 1, comprising a gas expansion chamber between the piston and said gas generator, and in that a leakage orifice, which is calibrated, is made in the wall of this expansion chamber.

6. An activated-stroke actuator of the type comprising a body housing a piston connected to a rod projecting at the end of said body and a gas generator for propelling said piston in response to an activation command, comprising a return braking arrangement, with an inertial actuating threshold, acting between the rod and the body in order to brake said rod only when it is subjected to a return force with an acceleration having a value above a threshold value, wherein said gas generator comprises pyrotechnic actuation mounted in said body opposite said piston, wherein said return-braking arrangement comprises at least one ball housed in an annular cavity formed between said rod and the an inner wall of said body, wherein said cavity comprises two adjacent portions in the continuation of one another, a first portion close to the piston and having a radial height greater than the diameter of said at least one ball, and a second portion having a radial height which decreases from the end of said first portion, said at least one ball engaging in said second portion when said return force is applied to said rod under an acceleration with a value above the aforementioned threshold value, wherein said braking arrangement additionally comprises a spring for retaining said at least one ball in said first portion, at rest, and a sleeve fitted into said cavity along said second portion and sliding against the inner wall of said body, and in that this sleeve is provided with a collar situated outside the cavity and in contact with said rod outside the cavity via a retaining element developing a limited cohesion force between said collar and said rod; and wherein the braking arrangement additionally comprises the spring, which elastically urges said at least one ball toward said second portion of the cavity, having a force constant which keeps spring force below said cohesion force connecting said collar and said rod, so long as the inertial actuating threshold acting between the rod and the body remains below the threshold value.

7. The actuator as claimed in claim 6, wherein said retaining element is an annular friction seal.

8. The actuator as claimed in claim 6, wherein the spring is mounted between the piston and the at least one ball.

9. The actuator as claimed in claim 6, wherein the sleeve no longer bears on the at least one ball when said return force is applied to said rod under an acceleration with a value above the threshold value.

10. The actuator as claimed in claim 6, wherein said at least one ball comprises a plurality of balls arranged side by side, annularly in said cavity.

11. The actuator as claimed in claim 10, wherein said plurality of balls are housed in a barrel-forming annular support mounted movably in said cavity.

12. The actuator as claimed in claim 6, additionally comprising an annular weight interposed between said piston and the at least one ball or balls.

13. The actuator as claimed in claim 6, comprising a gas expansion chamber between the piston and said gas generator, and in that a leakage orifice, which is calibrated, is made in the wall of this expansion chamber.

* * * * *